US010720094B1

(12) United States Patent
Yi et al.

(10) Patent No.: US 10,720,094 B1
(45) Date of Patent: Jul. 21, 2020

(54) DISPLAY APPARATUS AND METHOD FOR MOTION CONTROL OF A DISPLAY SCREEN BASED ON A VIEWING MODE

(71) Applicant: SONY CORPORATION, Tokyo (JP)

(72) Inventors: Hyehoon Yi, San Diego, CA (US); Toshihiko Fushimi, San Diego, CA (US); Lindsay Miller, San Diego, CA (US); David Young, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/246,881

(22) Filed: Jan. 14, 2019

(51) Int. Cl.
*G09G 3/20* (2006.01)
*G06F 3/01* (2006.01)
*G09G 5/38* (2006.01)
*G05B 15/02* (2006.01)
*G09G 5/14* (2006.01)
*G05D 3/20* (2006.01)
*G06F 3/16* (2006.01)

(52) U.S. Cl.
CPC ........... *G09G 3/2092* (2013.01); *G05B 15/02* (2013.01); *G06F 3/011* (2013.01); *G06F 3/017* (2013.01); *G09G 5/14* (2013.01); *G09G 5/38* (2013.01); *G05D 3/20* (2013.01); *G06F 3/167* (2013.01); *G09G 2354/00* (2013.01); *G09G 2380/02* (2013.01)

(58) Field of Classification Search
CPC combination set(s) only.
See application file for complete search history.

(56) References Cited

U.S. PATENT DOCUMENTS

| | | | |
|---|---|---|---|
| 6,007,038 A * | 12/1999 | Han | F16M 11/10 248/371 |
| 2013/0265257 A1 * | 10/2013 | Jung | G06F 3/0412 345/173 |
| 2014/0201015 A1 | 7/2014 | Snyder | |
| 2016/0117962 A1 | 4/2016 | Jung et al. | |
| 2016/0195856 A1 * | 7/2016 | Spero | G06N 5/046 700/90 |
| 2017/0053569 A1 * | 2/2017 | Votolato | G09F 7/20 |
| 2017/0103735 A1 * | 4/2017 | Oh | G06F 1/1626 |
| 2018/0355660 A1 * | 12/2018 | Noy | E05D 15/0665 |

* cited by examiner

*Primary Examiner* — Lisa S Landis
(74) *Attorney, Agent, or Firm* — Chip Law Group

(57) ABSTRACT

A display apparatus includes a display screen and circuitry. The circuitry receives a user input that corresponds to a viewing mode of the display screen. The circuitry detects a state of the display screen based on the received user input. The detected state corresponds to one of a rolled state or an unrolled state of the display screen. The circuitry controls a motion of the display screen based on the received user input. The control of the motion corresponds to at least the change in the detected state of the display screen or a change in a swivel angle of the display screen about a swivel axis. The swivel angle corresponds to a rotation of the display screen about the swivel axis.

20 Claims, 8 Drawing Sheets

DISPLAY APPARATUS AND METHOD FOR MOTION CONTROL OF A DISPLAY SCREEN BASED ON A VIEWING MODE

CROSS-REFERENCE TO RELATED APPLICATIONS/INCORPORATION BY REFERENCE

None.

FIELD

Various embodiments of the disclosure relate to display technologies. More specifically, various embodiments of the disclosure relate to a display apparatus and method for motion control of a display screen of the display apparatus.

BACKGROUND

Recent advancements in the field of display devices have led to the development of various techniques to provide an improved viewing experience to a viewer. In certain scenarios, a display screen of a conventional display device may be fixed at a particular position. In such cases, the viewer may have to be present at a specific distance and position to have a desired viewing experience. Furthermore, due to the fixed position of the display screen, the same viewing experience may not be available to the viewer from different locations. This may lead to degradation in user viewing experience.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A display apparatus and a method for motion control of a display screen of the display apparatus, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a disclosed display apparatus and method for motion control of a display screen of the display apparatus. Exemplary aspects of the disclosure provide a solution to enhance a viewing experience for viewers associated with the display apparatus. The disclosure provides a solution to dynamically control a motion of the display screen, based on a user input and a state of the display screen. In accordance with an embodiment, the angle and position of the display screen with respect to a position of a viewer may be adaptively controlled in accordance with a current position of the viewer who may watch media on the display screen from different positions. The motion of the display screen may also be controlled in accordance with a motion of the viewer of the display screen. This may also provide a level of comfort and flexibility to the viewer to switch a viewing position, a viewing posture, a viewing angle, and the like. The disclosed display apparatus may provide an on-demand motion control of the display screen, which in turn provides an immersive viewing experience to the viewer. The on-demand motion control of the display screen may provide a smooth and personalized viewing experience to the viewer for different applications, such as gaming, sports or casual entertainment, a media playback for a wide audience, or a wallpaper display as a home decor.

Figure 1:
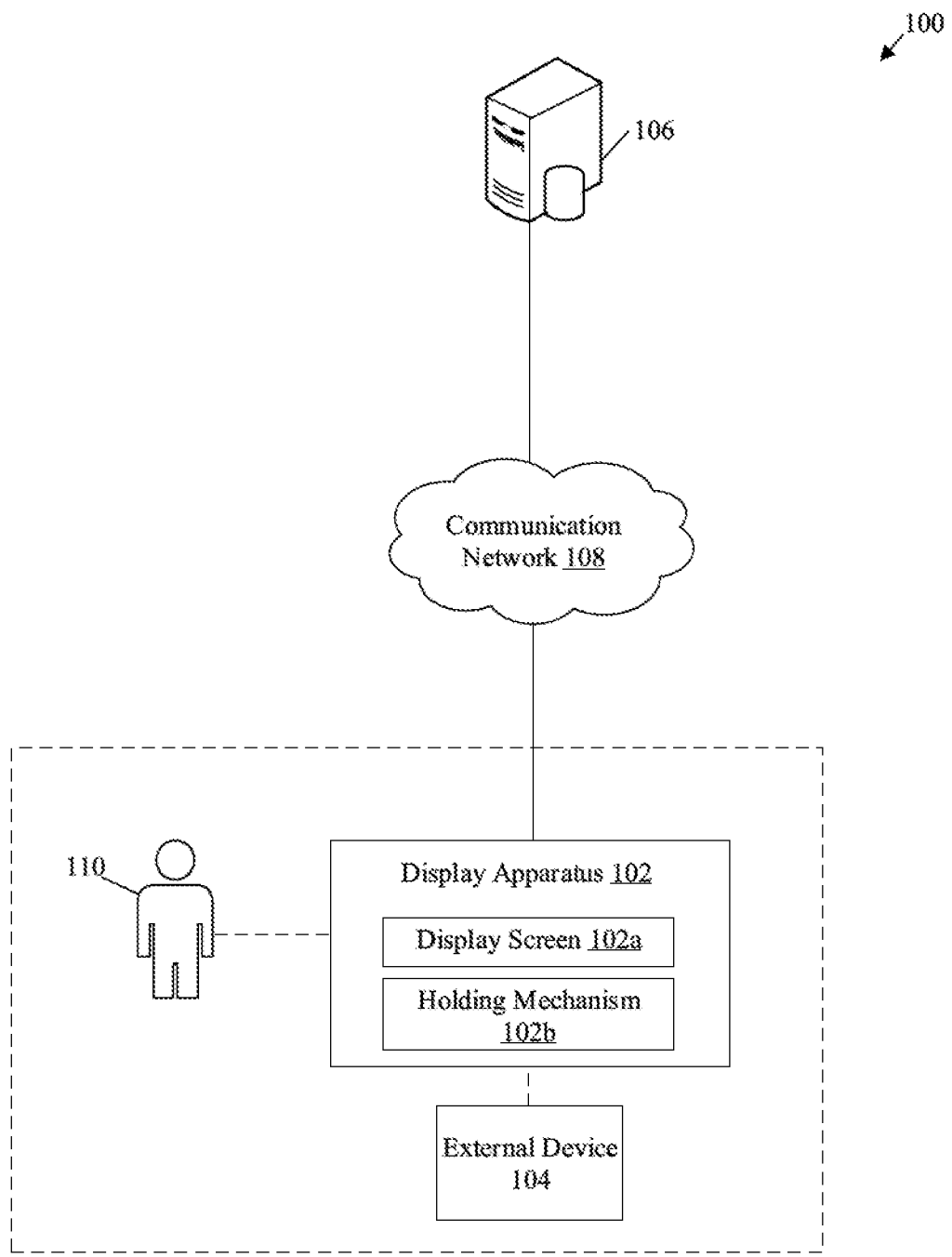
FIG. 1 is a block diagram that illustrates an exemplary network environment for a display apparatus for display screen motion control, in accordance with an embodiment of the disclosure.

FIG. 1 is a block diagram that illustrates an exemplary network environment for a display apparatus for display screen motion control, in accordance with an embodiment of the disclosure. With reference to FIG. 1, there is shown an exemplary network environment 100 that includes a display apparatus 102, an external device 104 that may be communicatively coupled to the display apparatus 102. The display apparatus 102 may include a display screen 102a and a holding mechanism 102b. There is further shown a data store 106 that may be communicatively coupled to the display apparatus 102, via a communication network 108. There is further shown a user 110 who is associated with the display apparatus 102.

The display apparatus 102 may comprise suitable logic, circuitry, and interfaces that may be configured to control a motion of the display screen 102a. The display screen 102a may be coupled to the holding mechanism 102b. The motion of the display screen 102a may be controlled based on motion of the holding mechanism 102b. Examples of the display apparatus 102 may include a television (TV), such as a smart television (TV), a three-dimensional (3D) display device, and a Free Viewpoint TV (FTV), a computing device, an e-paper based display device, a home theatre system, a video conferencing display device, a gaming console, a media processing system, a new form factor (NFF) television, or other consumer electronic (CE) device.

The display screen 102a may be a flexible, a bendable, a rollable, and/or a foldable display screen. The display screen 102a may be rolled, unrolled, or moved based on a current state of the display screen 102a or a change in a specified swivel angle of the display screen 102a at a swivel axis. The state may correspond to one of a rolled state or an unrolled state of the display screen 102a. The change in the state may correspond to a rolling or unrolling of the display screen 102a. The swivel angle may correspond to a rotation of the display screen 102a about the swivel axis. The display screen 102a may be realized through several display technologies, such as a Liquid Crystal Display (LCD) display, a Light Emitting Diode (LED) display, a plasma display, and an Organic LED (OLED) display technology, and other display technologies. In accordance with an embodiment, the display screen 102a may refer to a display screen of a smart-glass device, a see-through display, a projection-based display, an electro-chromic display, and/or a transparent display.

The holding mechanism 102b may be coupled to the display screen 102a of the display apparatus 102. The holding mechanism 102b may provide a physical support to the display screen 102a. The physical support may support the weight of the display screen 102a against one or more structural members, such as a wall, a floor, a ceiling, a table, a rod, a wire, or a stand, in an installation environment. The installation environment may be an open environment (such as a stadium, a park, a street, an open stage, or a road), or a closed environment (such as a room, a hall, or a concert stage of a closed auditorium). The display apparatus 102 may be configured to control of the motion of the holding mechanism 102b based on control signals. The holding mechanism may comprise actuators. The motion of the actuators may cause the motion of the holding mechanism 102b which in turn may cause the motion of the display screen 102a. Examples of the holding mechanism 102b may include, but are not limited to, a bracket, such as a mountable bracket, articulating wall mount, tilting wall mount, a holder, a side stand, an attachment panel, a support stand, a hook, and a frame.

The external device 104 may comprise suitable logic, circuitry, and interfaces that may be configured to receive a user input from the user 110. The user input may include a selection of a viewing mode of the display screen 102a. Example of external device 104 may include, but not limited to, a TV remote, a smartphone, a haptic switch, a gesture sensor, a motion sensor, a smart speaker, a smart voice assistant, a paired (or connectable) microphone, a set top box, a special-purpose device, a video-conferencing system, a mainframe machine, a computer work-station, a consumer electronic (CE) device, or a specialized physical input device (e.g., a button that is common for every product, or a product-specific button).

The data store 106 may comprise suitable logic, circuitry, and interfaces that may be configured to store and transmit media content to the display apparatus 102, in response to requests received from the display apparatus 102, via the communication network 118. Examples of the media content may include, but are not limited to, audio-video (AV) content, textual content, images, video content, animation content, gaming content, and/or interactive content. In some embodiments, the data store 106 may be configured to store a database of a plurality of viewing modes for the display screen 102a. The data store 106 may be configured to transmit the media content and/or settings associated with the plurality of viewing modes to the display apparatus 102, via the communication network 108. The data store 106 may be implemented as a cloud server, which may be utilized to execute aforementioned operations through web applications, cloud applications, HTTP requests, repository operations, file transfer, gaming operations, and the like. In such cases, the data store 106 may be a part of a content delivery network (CDN) and/or or a distributed network of media servers that may deliver on-demand, live, or linear media content to the display apparatus 102. Other examples of the data store 106 include, but are not limited to, a database server, a file server, a web server, an application server, a mainframe server, a cloud server, or other types of server.

In accordance with an embodiment, the data store 106 may be a personal media device that may deliver the media content to the display apparatus 102, via the communication network 108. Examples of the personal media device may include, but are not limited to, a smartphone, a music player, a video player, a laptop, a personal computer, a personal external storage, and a flash drive.

The communication network 108 may include one or more mediums through which the display apparatus 102 may communicate with the data store 106. Examples of the communication network 108 may include, but are not limited to, a Wireless Fidelity (Wi-Fi) network, a Local Area Network (LAN), a Personal Area Network (PAN), a Wireless Personal Area Network (WPAN), a Wireless Local Area Network (WLAN), a Wireless Wide Area Network (WWAN), a cloud network, a Long Term Evolution (LTE) network, a Metropolitan Area Network (MAN), and/or the Internet. Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof. In operation, a user input may be received by the display apparatus 102. The user input from may be provided by one or more users, such as the user 110. The user input may be a voice input, a gesture input, a touch-based input, or an input provided using the external device 104. The user input may correspond to a viewing mode of the display screen 102a. More specifically, the user input may be indicative of a user preference for different functions associated with the display screen 102a. Examples of the different functions may include playback controls, On/Off display state controls, or functions associated with voice commands, gesture inputs, touch inputs, user activities, user information, and/or a combination thereof. The display apparatus 102 may be configured to determine a configuration that is indicated in the received user input. For example, the configuration may be a screen configuration, for example, a distance, a height, a desired surface curvature of the display screen 102a, an extent of rolling of the display screen 102a. The configuration may further correspond to attributes of at least one viewing mode of a plurality of viewing modes of the display screen 102a.

In accordance with an embodiment, the user input may correspond to a selection of a viewing mode of the plurality of viewing modes of the display screen 102a. The plurality of viewing modes may include, but are not limited to, a cinema mode, an immersive mode, an immersive-three dimensional (3D) mode, a 3D mode, a wallpaper mode, a multi-user audience mode, a gaming mode, an ambience-based mode, an event-based mode, a content-adaptive mode, a karaoke mode, a child mode, a mirror mode, a pet mode, a shopping mode, or a default mode. The selection of the viewing mode may correspond to the configuration of the display screen 102a. For example, the user input may be a voice input, such as "Play a movie in Hall". In such cases, the cinema mode may be selected in the display apparatus 102 and the motion of the display screen 102a, may be controlled for the selected cinema mode.

In some embodiments, the display apparatus 102 may be configured to determine motion of the display screen 102a based on the user input. The display apparatus 102 may be further configured to control the motion of the display screen 102a based on different parameters related to the user 110, user preference, date-time information, display attributes of media content displayed on the display screen 102a. The different parameters may include, but are not limited to, a user position with respect to the display screen 102a, a user posture, a user motion, and distance of the user 110 from the display screen 102a.

Figure 2:
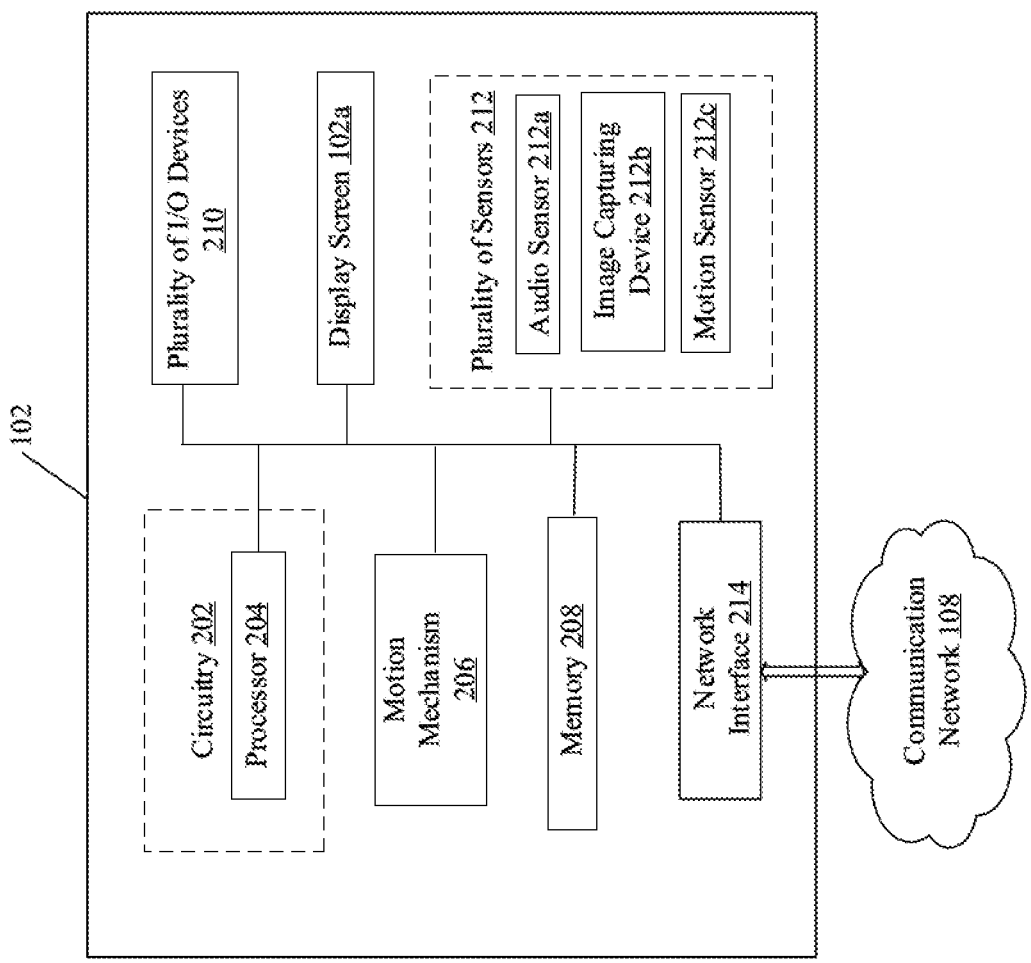
FIG. 2 is a block diagram that illustrates a display apparatus for motion control of a display screen of the display apparatus, in accordance with an embodiment of the disclosure.

FIG. 2 is a block diagram that illustrates a display apparatus for display screen control, in accordance with an embodiment of the disclosure. FIG. 2 is explained in conjunction with elements from FIG. 1. With reference to FIG. 2, there is shown the display apparatus 102. The display apparatus 102 may include circuitry 202 that may include a processor 204. The display apparatus 102 may further include a motion mechanism 206, a memory 208, a plurality of input/output (I/O) devices 210, a network interface 214, and the display screen 102a. In some embodiments, a plurality of sensors 212 may also be provided in the display apparatus 102. The plurality of sensors 212 may include an audio sensor 212a, an image capturing device 212b, and a motion sensor 212c. The circuitry 202 may be communicatively coupled with the display screen 102a, the motion mechanism 206, the memory 208, the plurality of I/O devices 210, the plurality of sensors 212, and the network interface 214, via a set of communication ports/channels or a channel bus.

The processor 204 may comprise suitable logic, circuitry, and interfaces that may be configured to execute instructions stored in the memory 208. The processor 204 may be configured to control the motion of the display screen 102a based on a user input. Examples of the processor 204 may include, but are not limited to an x86-based processor, an x64-based processor, a Reduced Instruction Set Computing (RISC) processor, a Reduced Instruction Set Computing (RISC) processor, a Complex Instruction Set Computing (CISC) processor, a Graphics Processing Unit (GPU), programmable logic devices (PLDs), an Application-Specific Integrated Circuit (ASIC), SOC, FPGA, a microcontroller, a central processing unit (CPU), or other control circuits.

The motion mechanism 206 may be a system of different operational (e.g., a servo motor as an actuator) and support components (e.g., a bracket, a mount, a spring component, a joint, or a slide lock) that may be coupled to the display screen 102a or the holding mechanism 102b of the display apparatus 102. The motion mechanism 206 may be configured to receive control signals associated with the motion of the display screen 102a from the circuitry 202. The motion mechanism 206 may control and cause the motion of the display screen 102a.

The memory 208 may comprise suitable logic, circuitry, and interfaces that may be configured to store instructions executable by the processor 204. The instructions may be associated with the control of the motion of the display screen 102a of the display apparatus 102. The memory 208 may be configured to store user preferences and user information of the user 110. The user information may include a calendar, user bio-data, past user inputs, favorite display settings, and the like. The user preference may include user's likes and dislikes for type of media content, visual quality, display settings, such as contrast, brightness, aspect ratio, screen orientation, and screen position. The memory 208 may be further configured to store a position and motion value of the display screen 102a for each viewing mode of the plurality of viewing modes. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The plurality of I/O devices 210 may comprise suitable logic, circuitry, and interfaces that may be configured to provide an I/O channel/interface between the user 110 and the different operational components of the display apparatus 102. The plurality of I/O devices 210 may receive a user input and present an output to the user 110. The plurality of I/O devices 210 may include various input and output ports to connect various other I/O devices that may communicate with different operational components of the display apparatus 102. Examples of an input device of the plurality of I/O devices 210 may include, but are not limited to, the audio sensor 212a, the image capturing device 212b, the motion sensor 212c, a touch screen, a keyboard/keypad, a set of buttons, a mouse, a joystick, and a microphone. Examples of an output device of the plurality of I/O devices 210 may include, but are not limited to, a display device (for example, the display screen 102a), a speaker, and a haptic or a sensory output device.

The plurality of sensors 212 may comprise suitable logic, circuitry, and interface that may be configured to detect different parameters related to the user 110 and the display apparatus 102. Examples of different parameters may include, but are not limited to, a user position and user motion with respect to the display apparatus 102, a user posture and orientation, and a facial expression of the user 110. The plurality of sensors 212 may include the audio sensors 212a, the image capturing device 212b, and the motion sensor 212c.

The audio sensor 212a may be configured to capture voice data of one or more users, such as the user 110. The audio sensor 212a may be a microphone or a set of microphones, e.g., a microphone array, to capture voice data of the user 110. The captured voice data may be a part of the user input or may be used to locate the user position with respect to a position of the display apparatus 102.

The image capturing device 212b may be configured to capture a plurality of images of a scene in field-of-view (FOV) of the image capturing device 212b. The plurality of images may be captured to determine a number of viewers of the display screen 102a, a user position, a distance of the user 110 from the display apparatus 102, an orientation of the user 110, a posture of the user 110 with respect to the display apparatus 102, a facial expression of the user 110, and a mood of the user 110. The image capturing device 212b may be positioned at a particular location within, or on the display apparatus 102 to capture the plurality of image frames. Examples of the image capturing device 212b may include, but are not limited to, an image sensor, a wide-angle camera, depth sensor, a motion sensor, an action camera, a camcorder, a time-of-flight camera (TOF camera), IR sensor, a thermal sensor, a night-vision camera, a position sensor, a posture sensor, and/or other image capturing devices.

The motion sensor 212c may comprise suitable logic, circuitry, and interfaces that may be configured to determine a state of the display screen 102a. The motion sensor 212c may be further configured to detect a current swivel angle of the display screen 102a. The motion sensor 212c may be attached to the display screen 102a or may be embedded or integrated in one or more layers of the display screen 102a. Examples of the motion sensor 212c may include, but are not limited to, a flexible resistance sensor, a potentiometer-based sensor, and a pressure or stress-based sensor.

The network interface 214 may comprise suitable logic, circuitry, and interfaces that may be configured to establish a communication between the display apparatus 102 and different communication devices, such as the data store 106, via the communication network 108. The network interface 214 may implement known technologies to support wireless communication. The network interface 214 may include, but are not limited to, an antenna, a radio frequency (RF) transceiver, one or more amplifiers, a tuner, one or more oscillators, a digital signal processor, a coder-decoder (CO-DEC) chipset, a subscriber identity module (SIM) card, and/or a local buffer.

Figure 3:
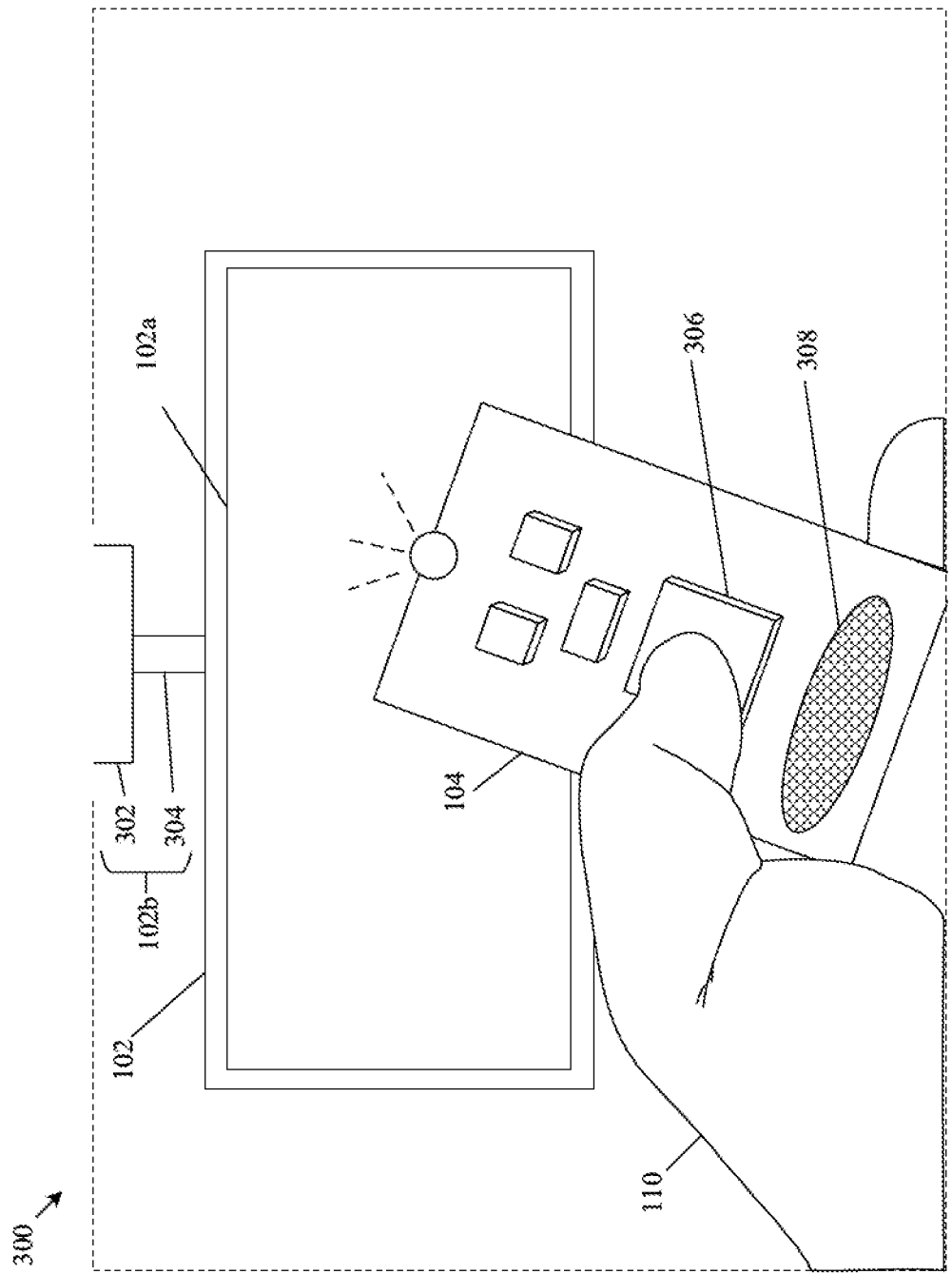
FIG. 3 illustrates an exemplary scenario for motion control of a display screen of the display apparatus of FIG. 2, via an external device, in accordance with an embodiment of the disclosure.
Figure 5:
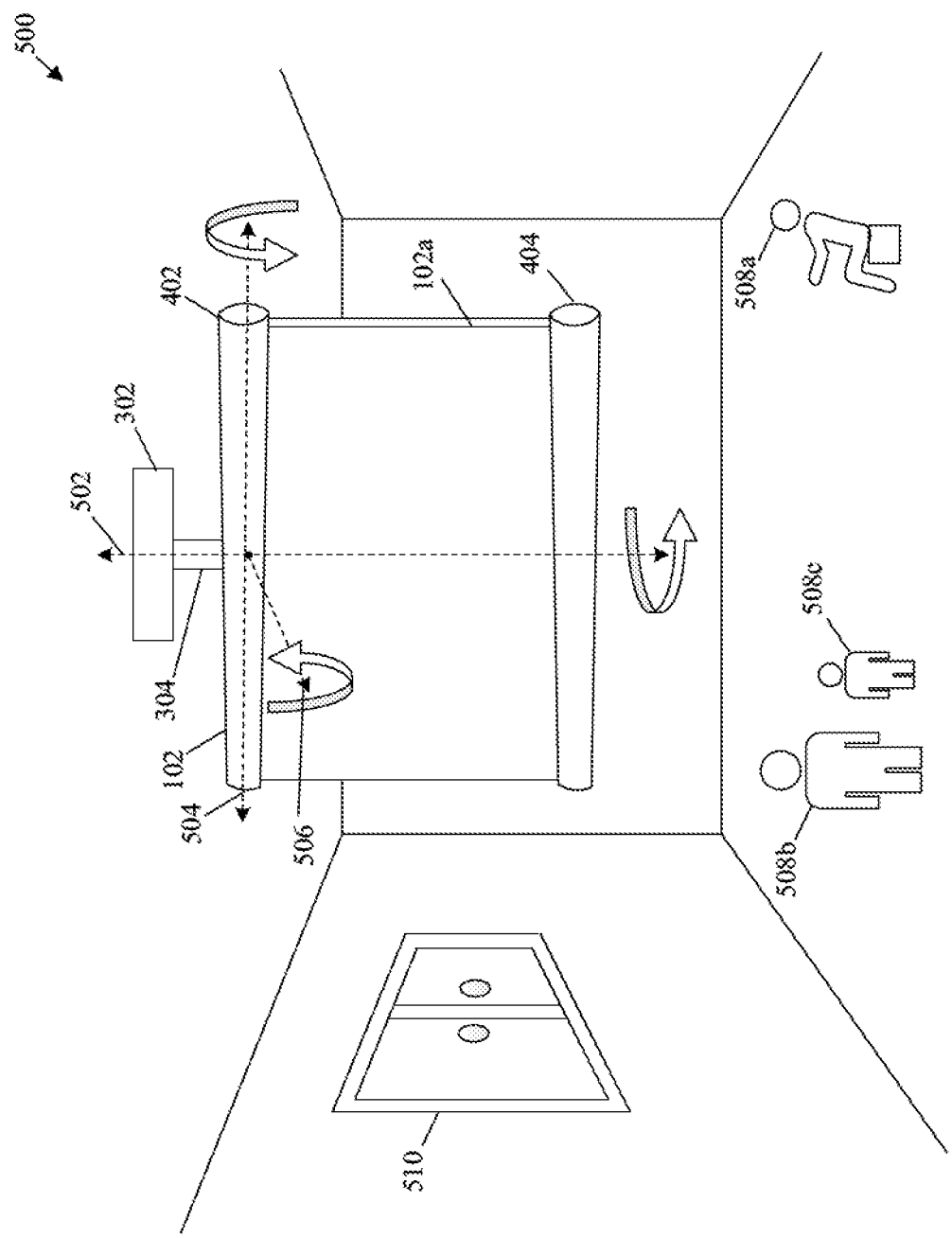
FIG. 5 illustrates an exemplary scenario of the display apparatus of FIG. 2 for motion control of a display screen in different angles, in accordance with an embodiment of the disclosure.

FIG. 3 illustrates an exemplary scenario for motion control of a display screen of the display apparatus of FIG. 2, via an external device, in accordance with an embodiment of the disclosure. FIG. 3 is explained in conjunction with elements from FIGS. 1 and 2. With reference to FIG. 3, there is shown an exemplary scenario 300 for implementation of the display apparatus 102. In this exemplary scenario 300, the holding mechanism 102b may include a support portion 302 and a swivel portion 304 coupled to a first end (e.g., top end) of the display screen 102a of the display apparatus 102. The support portion 302 and the swivel portion 304 may align, balance the weight, or, act as a mount for the display screen 102a on a ceiling, as shown in an example. In another example, support portion 302 may mount the display screen 102a on a structural member of the installation environment such as a floor or a wall (not shown). The swivel portion 304 may aid in rotation of the display screen 102a about the swivel axis by changing the swivel angle and orientation of the display screen 102a. An example of the swivel axis is shown in FIG. 5

In the exemplary scenario 300, the processor 204 may be configured to receive a user input via the external device 104, such as the TV remote, paired with the display apparatus 102. The user input may be received based on a user preference to watch media content (e.g., a favorite TV show) on the display apparatus 102. The user input may be received as a touch input on a touch screen or a hardware button 306 of the external device 104. Alternatively, the user input may be received as a voice command via a microphone 308 of the external device 104.

The processor 204 may be further configured to display a plurality of viewing modes on the display screen 102a of the display apparatus 102. The plurality of viewing modes may include a cinema mode, an immersive mode, an immersive-three dimensional (3D) mode, a 3D mode, a wallpaper mode, a multi-user audience mode, a gaming mode, a mood-based mode, an ambience-based mode, an event-based mode, a content-adaptive mode, a karaoke mode, a child mode, a mirror mode, a pet mode, a shopping mode, and a default mode. Each viewing mode may define a specific pre-stored position in the installation environment, a swivel angle such as an angle of 0° to 90° with respect to a reference direction, and a state such as a rolled state, a partially rolled state, or an unrolled state, of the display screen 102a.

Each viewing mode may define a different configuration of the display screen 102a. As an example, the wallpaper mode may specify the unrolled state and zero swivel angle from the reference direction. The child mode may specify the partially rolled state and a small swivel angle, such as a swivel angle of "45°" from the reference direction where a child's play area is placed. The reference point may be a direction in which the display screen 102a faces. In response to the user input, the processor 204 may be configured to select the viewing mode of the display screen 102a. The user input may include a user selection of the viewing mode on the display screen, via the external device 104.

In yet another example, the display screen 102a may be in an unrolled state and at 90° swivel angle that may correspond to a cinema mode, which may be suited for viewing a movie by more than one user, such as a family. The cinema mode may specify a 90° swivel angle as multiple users may watch the movie while sitting on a couch that is 90° from the reference direction and a fully unrolled state so that the users may enjoy the movie on the biggest possible display area of the display screen 102a. The unrolled state and the 90° swivel angle may be pre-stored in the memory 208 of the display apparatus 102 as the configuration of the display screen 102a for the cinema mode. At any particular time, the configuration may be updated by the user 112. For example, a different configuration may be set (user-configurable) for a new furniture arrangement or a different installation environment. Alternatively, the processor 204 may be configured to update the configuration setting for each viewing mode based on information from the plurality of sensors 212.

The processor 204 may be configured to receive a user input that may correspond to a user request to start a game. The processor 204 may be configured to select the configuration of the display screen 102a that correspond to the gaming mode. The gaming mode may specify a defined state and a defined value of swivel angle of the display screen 102a. The processor 204 may be configured to change the configuration from the cinema mode to the gaming mode. The processor 204 may be configured to control the motion of the display screen 102a such that the state and the swivel angle matches the defined state and defined value for the gaming mode. More specifically, the processor 204 may be configured to control the holding mechanism 102b to control the motion and change the configuration of the display screen 102a. The support portion 302 of the holding mechanism 102b may be configured to support the weight of the display apparatus 102 and the swivel portion 304 may be configured to cause the motion of the display apparatus 102.

In accordance with an embodiment, the processor 204 may be configured to compute a motion value based on the configuration of the display screen 102a that corresponds to the selected viewing mode. The processor 204 may be configured to control the motion mechanism 206 to control the motion of the display apparatus 102 based on the computed motion value. The motion of the display apparatus 102 may correspond to the configuration of the display screen 102a for the selected viewing mode. The support portion 302 may be coupled to a room ceiling such that the display apparatus 102 hangs from the room ceiling. The swivel portion 304 may comprise at least one actuator. The at least one actuator may be configured to control the motion of the display screen 102a about the swivel axis. The processor 204 may be configured to control the motion of the at least one actuator to change the swivel angle of the display screen 102a based on the selected viewing mode.

Figure 4A:
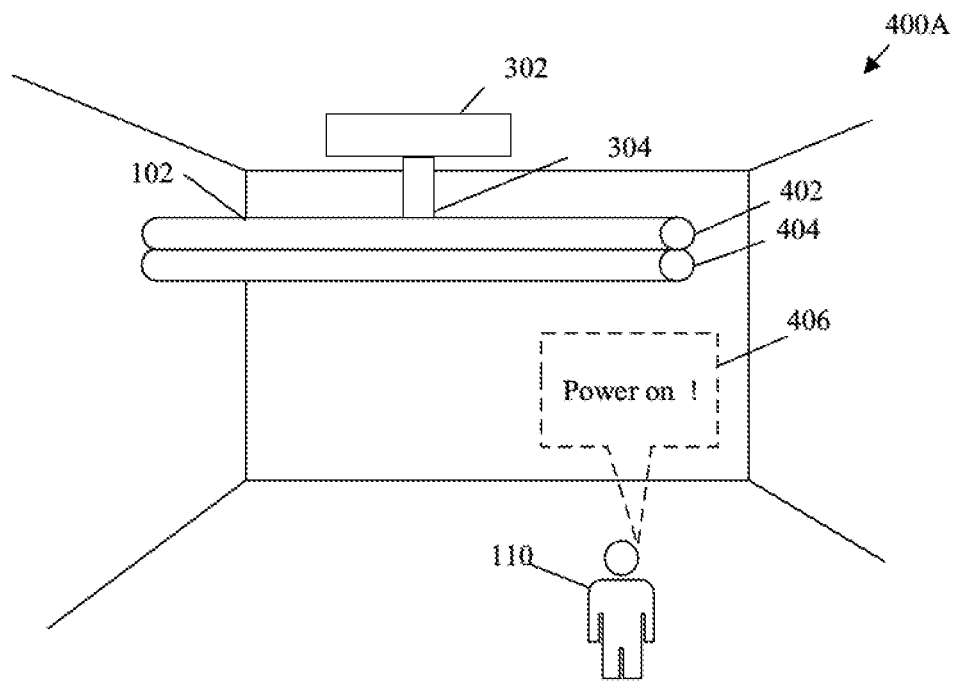
FIGS. 4A and 4B, collectively, illustrates an exemplary scenario of the display apparatus of FIG. 2 for motion control of a display screen from a rolled state to an unrolled state, in accordance with an embodiment of the disclosure.
Figure 4B:
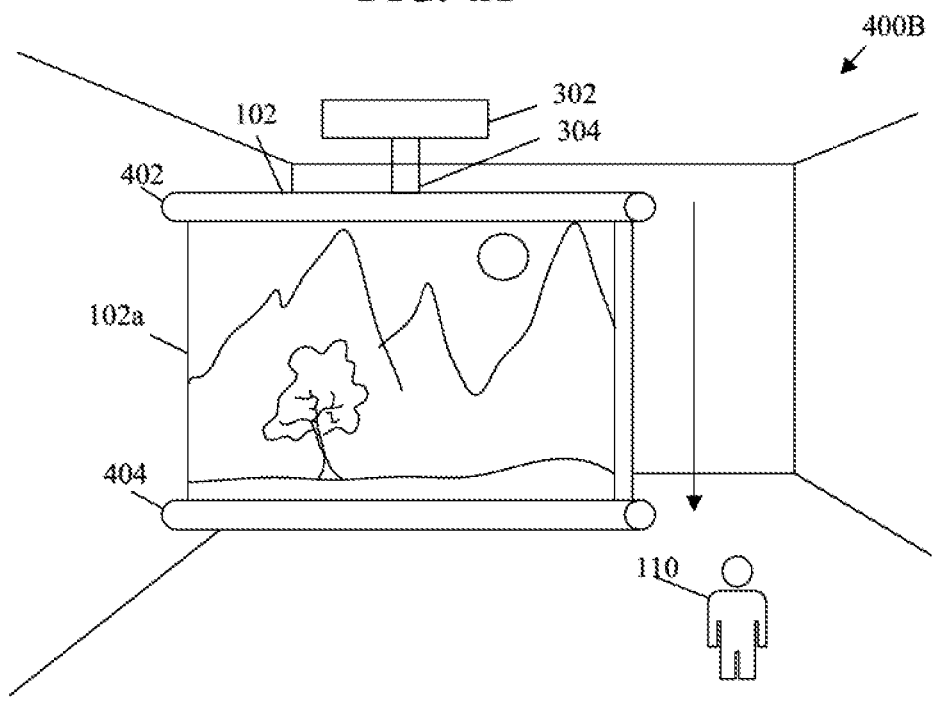

FIGS. 4A and 4B, collectively, illustrates an exemplary scenario of the display apparatus of FIG. 2 for motion control of a display screen from a rolled state to an unrolled state, in accordance with an embodiment of the disclosure. FIGS. 4A and 4B are explained in conjunction with elements from FIGS. 1, 2, and 3. With reference to FIGS. 4A and 4B, there is shown exemplary scenarios 400A and 400B to depict motion of the display screen 102a in rolled and unrolled state.

In the exemplary scenario 400A, there is shown the display apparatus 102, the support portion 302, the swivel portion 304, a first roll portion 402, and a second roll portion 404. The display apparatus 102 may be in a rolled state, where the display screen 102a may be rolled around the first roll portion 402. The state of the display screen 102a may change as the second roll portion 404 moves upward or downward. For example, the state of the display screen 102a may change from the rolled state to the unrolled state (as shown in exemplary scenario 400B in FIG. 4B) with the downward motion of the second roll portion 404. The state of the display screen 102a may return to the rolled state from the unrolled state with the upward motion of the second roll portion 404. The downward motion increases the distance of the second roll portion 404 from the support portion 302, whereas the upward motion reduces the distance of the second roll portion 404 from the support portion 302.

With reference to FIGS. 4A and 4B, the processor 204 may be configured to receive the user input such as the voice command 406 to control the motion of the display screen 102a, via the plurality of I/O devices 210. In response to the received user input, the motion sensor 212c may be configured to detect the state of the display screen 102a. The processor 204 may be configured to receive the detected state of the display screen 102a from the motion sensor 212c. The processor 204 may be further configured to determine whether the detected state matches the state that corresponds to the received user input. The processor 204 may be further configured to control the actuators (of the motion mechanism 206) to drive the second roll portion 404 downward or upward to match the state that corresponds to the received input. For example, the processor 204 may receive the voice command 406 of 'Power on.' The power on state of the display apparatus 102 may correspond to the default mode of the plurality of viewing modes. The default mode may correspond to an unrolled state of the display screen 102a. The processor 204 may be configured to determine that the display apparatus 102 is in a rolled state that does not correspond to the default mode. Subsequently, the processor 204 may be configured to control the actuators of the motion mechanism 206 to drive the second roll portion 404 downward (away from the support portion 302) to change the rolled state of the display screen 102a to the unrolled state.

In accordance with an embodiment, the processor 204 may be configured to control the motion of the second roll portion 404 such that the display screen is in a partially rolled state. The partially rolled state may correspond to a state of the display apparatus 102 where a portion of the display screen 102a may be rolled around the first roll portion 402 and the remaining portion of the display screen 102a may be in an unrolled state. A viewing mode such as the karaoke mode may correspond to the partially rolled state of the display screen 102a so that enough space below the display screen is available for the user to stand and at the same time the display screen 102a may display the lyrics for the karaoke.

In accordance with another embodiment, the display apparatus 102 may be further configured to determine different parameters related to the user 110, user preference, date-time information, and display attributes of media content displayed on the display screen 102a. The different parameters may include, but are not limited to, a user position with respect to the display screen 102a, a user posture, user motion, and distance of the user 110 from the display screen 102a. The user preference may be stored in the memory 208. The processor 204 may be further configured to control the motion to change the state of the display screen 102a based on at least one of the determined different parameters related to the user 110, the determined user preference, the determined date-time information, and the determined display attributes of media content displayed on the display screen 102a.

The processor 204 may be further configured to adjust a set of display attributes of media content on the display screen 102a based on the motion of the display screen 102a. The set of display attributes may include, but are not limited to, contrast, brightness, aspect ratio, and resolution of the media content. For example, based on a user input, the processor 204 may be configured to change the state of the display screen 102a from the unrolled state to a partially rolled state. Accordingly, the processor 204 may be configured to adjust the set of display attributes such as the aspect ratio of the media content displayed on the display screen 102a based on the motion of the display screen 102a. The adjustment of the set of display attributes may maximize the display area of the media content for each state of the display screen 102a.

In accordance with another embodiment, the processor 204 may be further configured to display media content on an unrolled display portion of the display screen 102a. The processor 204 may be further configured to adjust a set of display attributes the displayed media content in accordance with the area of the unrolled display portion. For example, the display screen 102a may be in the rolled state. The processor 204 may be configured to receive a user input to change the state of the display screen 102a to the partially rolled state. Subsequently, the processor 204 may be configured to control the actuators of the motion mechanism 206 to unroll the display screen 102a. The processor 204 may be further configured to display the media content on an area of the unrolled portion of the display screen 102a. The processor 204 may be further configured to adjust the set of attributes such as the aspect ratio of the displayed media content based on the motion of the display screen 102a and the change in state of the display screen 102a. Thus, the display apparatus 102 with an on-demand rollable display screen, such as the display screen 102a may improve the viewing experience of a viewer. Furthermore, the display apparatus 102 may be a rollable display apparatus, which occupies less space and be more aesthetically pleasing to the eye when not in use. The display apparatus 102 may be thinner, lighter, and more durable.

FIG. 5 illustrates an exemplary scenario of the display apparatus of FIG. 2 for motion control of a display screen in different angles, in accordance with an embodiment of the disclosure. FIG. 5 is explained in conjunction with elements from FIG. 1, 2, 3, 4A and 4B. With reference to FIG. 5, there is shown an exemplary scenario 500 for motion control of the display screen 102a.

In the exemplary scenario 500, there is shown the display apparatus 102 in an installation environment. The display apparatus 102 may be detachably attached to room ceiling by the support portion 302. The display apparatus 102 may comprise the display screen 102a configured to display the media content to the plurality of users, such as a first user 508a, a second user 508b, and a third user 510c. The support portion 302, the swivel portion 304, a first roll portion 402, and a second roll portion 404 may collectively be the holding mechanism 102b (FIG. 1). The swivel portion 304 may be configured to rotate about at least one of a first swivel axis 502, a second swivel axis 504, or a third swivel axis 506. The installation environment may be a room that comprises a plurality of users (such as a first user 508a, a second user 508b, and a third user 510c) and a window 510. The processor 204 may be further configured to control a rotatory motion of the swivel portion 304 about a swivel axis, such as the first swivel axis 502, to change the swivel angle of the display apparatus 102.

In accordance with an embodiment, the processor 204 may be configured to receive the user input, via the plurality of I/O devices 210, from one of the plurality of users such as the first user 508a to control the motion of the display screen 102a. In response to the received user input, the processor 204 may be configured to detect a current swivel angle of the display screen 102a with respect to a reference line or a default plane (e.g., the surfaces of the display screen 102a and the support portion 302 that may lie in a same plane). The processor 204 may be further configured to determine whether the current swivel angle matches the swivel angle that corresponds to the received user input. The processor 204 may be further configured to control the actuators (of the motion mechanism 206) to rotate the support portion in a clock wise or anti-clock wise direction to match the swivel angle that corresponds to the received input. For example, a swivel angle for the cinema mode may correspond to 180° so that the display screen 102a faces a couch on which that the plurality of users may be seated to watch a movie together. The processor 204 may be configured to determine a current swivel angle with respect to the reference line or the default plane. Subsequently, the processor 204 may be configured to control the actuators of the motion mechanism 206 to rotate the swivel portion 304 to change the swivel angle of the display screen 102a to match the swivel angle of the cinema mode.

In accordance with another embodiment, the display apparatus 102 may be further configured to determine different parameters related to the user 110, user preference, date-time information, and display attributes of media content displayed on the display screen 102a. The date-time information may correspond to a time of a day, a day of a week, or a date. The different parameters may include but is not limited to a user position with respect to the display screen 102a, a user posture, user motion, and distance of the user 110 from the display screen 102a. The user preferences may be stored in the memory 208. The processor 204 may be further configured to control the swivel angle of the display screen 102a based on at least one of the determined different parameters related to the user 110, the determined user preference(s), the determined date-time information, and the determined display attributes of media content displayed on the display screen 102a.

In one example, the processor 204 may receive the date-time information such as the time of the day, from the plurality of sensors 212. The time of the day may be, for example, a time of day where sunlight from the window 510 may enter the room and cause a glare on the display screen 102a and hamper the display of the media content on the display screen 102a. The processor 204 may be configured to detect the lighting conditions in the room based on the plurality of sensors 212 and accordingly determine a suitable swivel angle of the display screen 102a about the first swivel axis 502. The processor 204 may be configured to control the actuator to cause a motion of the display screen 102a in a certain direction, for example, anti-clockwise direction, which avoids or at least reduces the glare from the window 510 on the display screen 102a.

In another example, the plurality of sensors 212 may be configured to detect positions of the plurality of users such as the first user 508a, the second user 508b, and the third user 508c, with respect to the display screen 102a. The processor 204 may be configured to receive the detected positions of the plurality of user from the plurality of sensors 212. The processor 204 may be further configured to determine a swivel angle about the first swivel axis 502 such that the display screen 102a is visible to each user of the plurality of users. In yet another example, the plurality of sensors 212 may be further configured to detect heights of the plurality of users such as the first user 508a, the second user 508b, and the third user 508c, with respect to the display screen 102a. The processor 204 may be configured to receive the detected heights of the plurality of user from the plurality of sensors 212. The processor 204 may be further configured to determine a specific swivel angle about the second swivel axis 504 such that the display screen 102a is suitably visible to each user of the plurality of users such as the third user 508c. In another example, the plurality of sensors 212 may be configured to detect postures of the plurality of users such as the first user 508a, the second user 508b, and the third user 508c, with respect to the display screen 102a. The first user 508a may be in a sitting posture, and the second user 508b and the third user 508c may be in a standing posture. The processor 204 may be configured to receive the detected postures of the plurality of user from the plurality of sensors 212. The processor 204 may be further configured to determine a swivel angle about the second swivel axis 504 and the third swivel axis 506 such that the display screen 102a is visible to each user of the plurality of users. Thus, the display apparatus 102 with the display screen 102a having adaptive rotatable and rolling function may increase user convenience and viewing experience in different installation environments.

Figure 6:
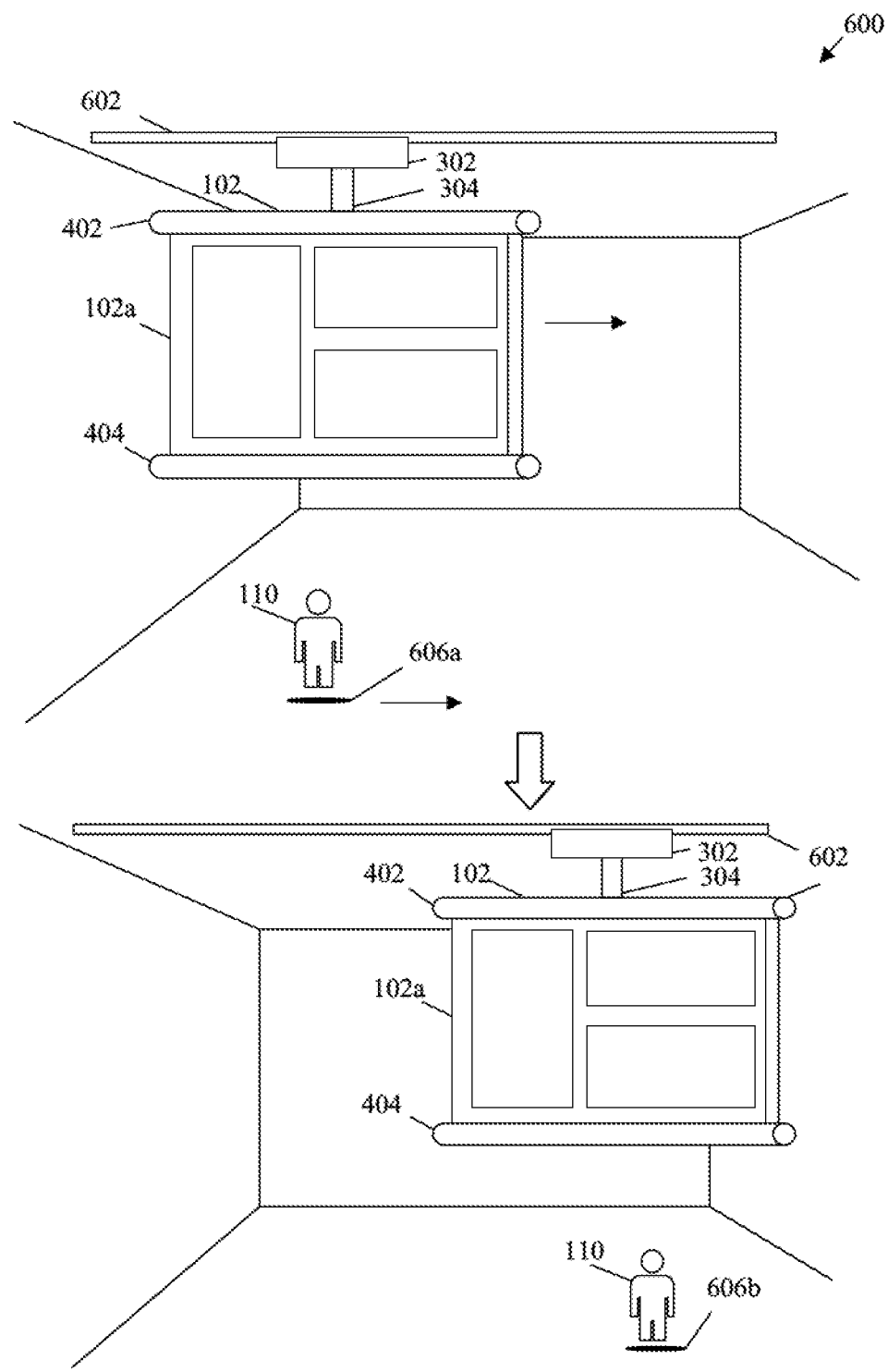
FIG. 6 illustrates an exemplary scenario of the display apparatus of FIG. 2 to depict motion of a display screen along a track, in accordance with an embodiment of the disclosure.

FIG. 6 illustrates an exemplary scenario of the display apparatus of FIG. 2 to depict motion of a display screen along a track, in accordance with an embodiment of the disclosure. FIG. 6 is explained in conjunction with elements from FIGS. 1, 2, 3, 4, and 5. With reference to FIG. 6, there is an exemplary scenario 600.

In the exemplary scenario 600, there is shown the display apparatus 102 that may comprise the display screen 102a and a track 602. The support portion 302, the swivel portion 304, a first roll portion 402, and a second roll portion 404 may be a part of the holding mechanism 102b (FIG. 1). In the exemplary scenario 600, the display screen 102a is shown in unrolled state and extended between the first roll portion 402 and the second roll portion 404. The track 602 may be mechanically coupled to the support portion 302 and may be attached to a ceiling of the installation environment, as shown in an example. The processor 204 may be configured to control a sideways motion of the holding mechanism 102b and the display screen 102a attached to the holding mechanism 102b along the track 602 (as shown in an example). In other words, the processor 204 may be configured to control a horizontal displacement of the display screen 102a along a horizontal axis on the track 602.

In accordance with an embodiment, the processor 204 may be configured to control the position of the display screen 102a with respect to a current user position in the room. For example, the position of the display screen 102a may change from the first position to the second position or vice-versa based on a sliding movement along the track 602. The processor 204 may be configured to track the user movement using the motion sensor 212c and accordingly control the actuators (of the motion mechanism 206) to drive the support portion 302 along the track 602. Alternatively stated, instead of one sensor, the plurality of sensors 212 may be configured to detect the user information such as the user position of the user 110 of the display apparatus 102. The processor 204 may be further configured to control a direction of the horizontal displacement in accordance with the detected user position. For example, the user 110 may be at an initial position 606a and the display apparatus 102 may be in the track mode. The display apparatus 102 may be configured to track the user 110 in the track mode. The plurality of sensors 212 may be configured to determine the change in position of the user 110 from an initial position 606a to a final position 606b. The processor 204 may be configured to change the position of the display screen 102a based on the detected change in the position of the user 110. Subsequently, the processor 204 may be configured to control the actuators of the motion mechanism 206 to drive the support portion 302 along the track 602 corresponding to the change in position of the user 110.

In accordance with another embodiment, the processor 204 may be further configured to control a vertical displacement of the display screen along a vertical axis. The vertical axis may be perpendicular to the horizontal axis. The vertical displacement may be an upward or downward motion of the display screen 102a with respect to a ground plane. The vertical displacement may correspond to a change in an elevation of the display screen 102a from a ground plane of the installation environment. For example, the plurality of sensors 212 may be configured to detect a posture of the user 110 with respect to the display screen 102a. The processor 204 may detect a change in posture of the user 110 from a standing position to a sitting position. The processor 204 may be configured to receive the detected change in posture of the user 110 from the plurality of sensors 212. The processor 204 may be further configured to determine a change in elevation level of the display screen 102a based on the change in posture of the user 110. Subsequently, the processor 204 may be configured to control the actuators of the motion mechanism 206 to drive the support portion 302 downward or upward to cause the vertical displacement of the display screen 102a corresponding to the change in posture of the user 110.

Figure 7:
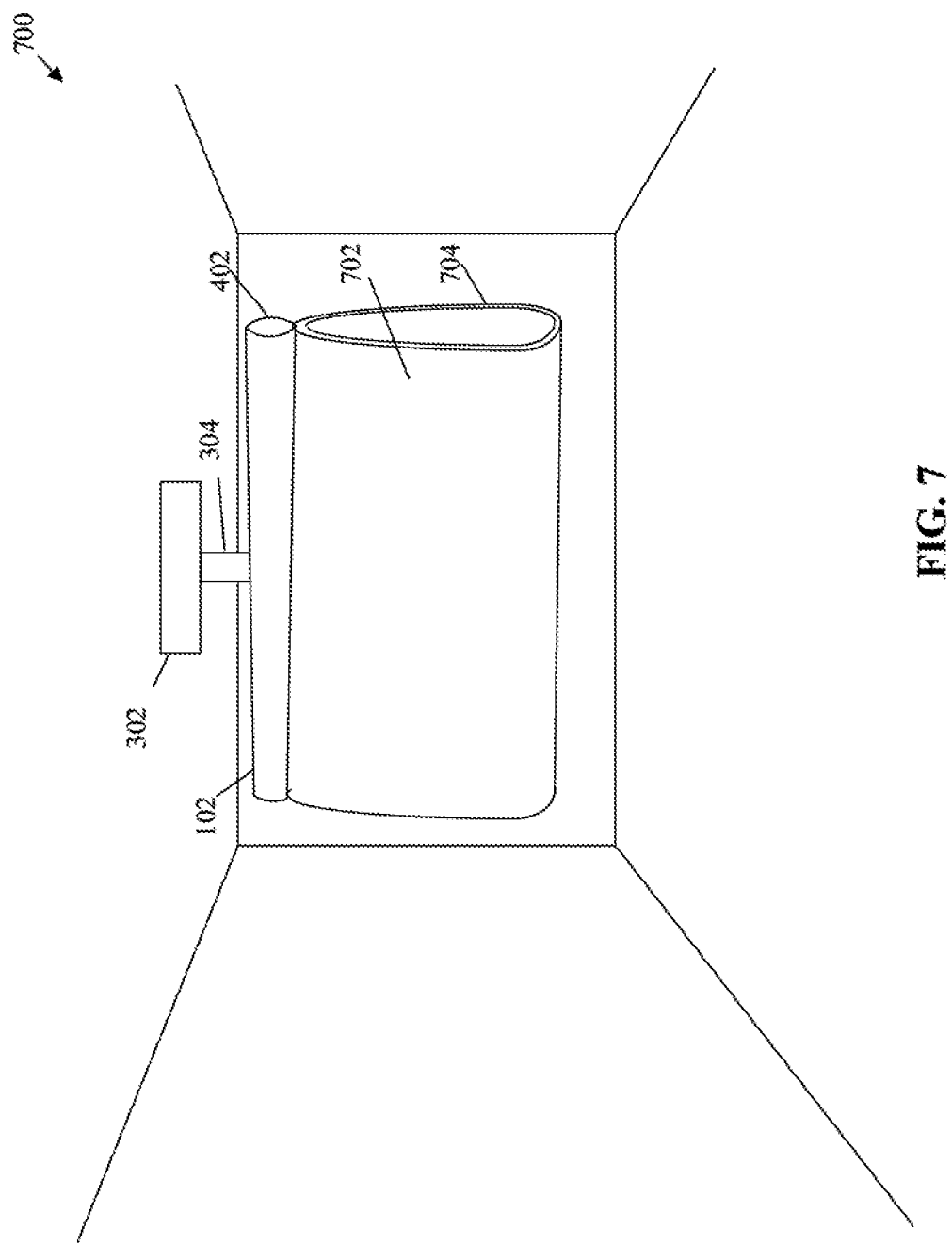
FIG. 7 illustrates an exemplary scenario for motion control related to folding of a display screen of the display apparatus of FIG. 2, in accordance with an embodiment of the disclosure.

FIG. 7 illustrates an exemplary scenario for motion control related to folding of a display screen of the display apparatus of FIG. 2, in accordance with an embodiment of the disclosure. FIG. 7 is explained in conjunction with elements from FIGS. 1, 2, 3, 4, 5, and 6. With reference to FIG. 7, there is shown an exemplary scenario 700 that depicts a fold of the display screen 102a.

In the exemplary scenario 700, there is further shown a first display portion 702 and a second display portion 704 of the display screen 102a. The processor 204 may be further configured to control a motion of the display screen 102a to fold itself such that two display screens or display areas, such as the first display portion 702 and the second display portion 704 are formed about a fold axis. The first display portion 702 may face a first direction and the second display portion may face a second direction that is different from the first direction. Thus, a single display apparatus, such as the display apparatus 102, may be able to display the same media content or different media content to an audience in a plurality of viewing directions. For example, the processor 204 may be further configured to display a first media content on the first display portion 702 and a second media content on the second display portion 704 of the display screen 102a. For example, the processor 204 may be configured to display a video on the first display portion 702 and a closed caption content corresponding to the video (or a different video) on the second display portion 704.

In some embodiments, the processor 204 may be configured to unroll and fold the display screen 102a about the folding axis, in response to a user input. The processor 204 may be further configured to control the actuators (of the motion mechanism 206) to unroll the display screen 102a from the first roll portion 402 based on the received user input.

Figure 8:
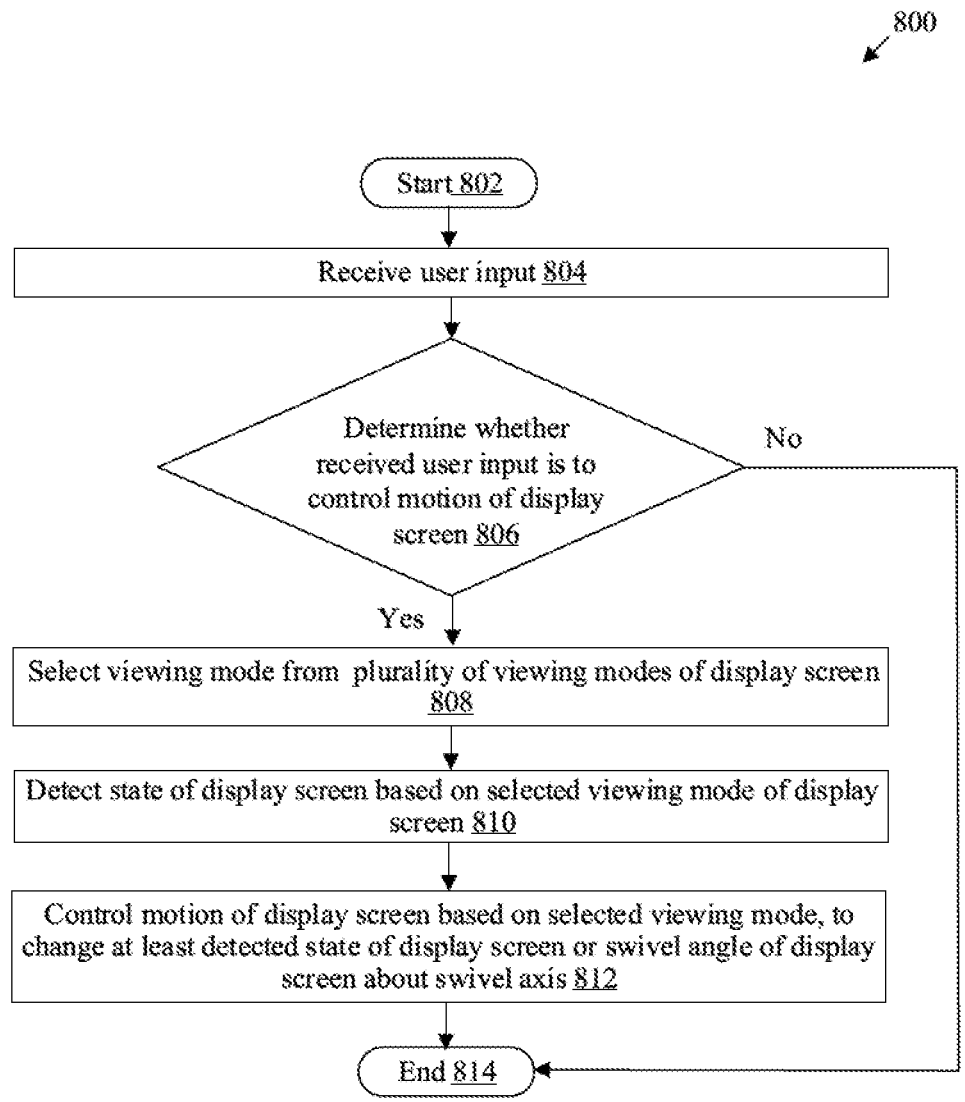
FIG. 8 is a flowchart that illustrates an exemplary method for motion control of a display screen, in accordance with an embodiment of the disclosure.

FIG. 8 is a flowchart that illustrates an exemplary method for display screen motion control, in accordance with an embodiment of the disclosure. With reference to FIG. 8, there is shown a flowchart 800. The flowchart 800 is described in conjunction with FIGS. 1, 2, 3, 4, 5, 6, and 7. The operations from 802 to 814 may be implemented in the display apparatus 102. The operations of the flowchart 800 may start at 802 and proceed to 804.

At 804, user input may be received from the plurality of I/O devices 210 or the plurality of sensors 212. The user input may be a touch input, a gesture input, a voice command, or other inputs types.

At 806, it may be determined whether the received user input is to control motion of the display screen 102a. The processor 204 may be further configured to determine whether the user input is received to control motion of the display screen 102a. In case it is determined that the received user input is to control motion of the display screen 102a, the control passes to 808. Otherwise, control passes to end 814.

At 808, a viewing mode may be selected from a plurality of viewing modes of the display screen 102a based on the received user input. The processor 204 may be further configured to select a viewing mode of the display screen 102a based on the received user input. The selection of the viewing mode may correspond to a configuration of the display screen 102a. The plurality of viewing modes may include, but are not limited to, a cinema mode, a cinema mode, an immersive mode, an immersive-three dimensional (3D) mode, a 3D mode, a wallpaper mode, a multi-user audience mode, a gaming mode, a mood-based mode, an ambience-based mode, an event-based mode, a content-adaptive mode, a karaoke.

At 810, a state of display screen may be detected based on the selected viewing mode of display screen 102a. The processor 204 may be further configured to detect the state of the display screen 102a based on the selected viewing mode. The state of the display screen 102a may correspond to one of a rolled state or an unrolled state of the display screen 102a.

At 812, the motion of display screen 102a may be controlled based on the selected viewing mode, to change at least the detected state of the display screen 102a or swivel angle of display screen 102a about swivel axis. The processor 204 may be further configured to control the motion of the display screen 102a based on the selected viewing mode. The motion of the display screen 102a may correspond to at least the detected state of the display screen 102a or swivel angle of display screen 102a about swivel axis. The motion of the holding mechanism 102b may correspond to a change in the surface curvature of the display screen 102a. The change in the state may correspond to a rolling of the display screen 102a from the unrolled state or an unrolling of the display screen 102a that may be in rolled state. As an example, the processor 204 may be configured to transmit control signals to the motion mechanism 206 that may drive the holding mechanism 102b based on the selected viewing mode. Control passes to end 814.

Various embodiments of the disclosure provide display apparatus (e.g. display apparatus 102). The display apparatus 102 may include a display screen (e.g. display screen 102a) and a circuitry (e.g. circuitry 202). The circuitry 202 may be configured to receive a user input that corresponds to a viewing mode of the display screen102a. The detected state may correspond to one of a rolled state or an unrolled state of the display screen102a. The circuitry 202 may be configured to control a motion of the display screen 102a based on the received user input. The control of the motion may correspond to at least the change in the detected state of the display screen 102a or a change in a swivel angle of the display screen 102a about a swivel axis. The swivel angle may correspond to a rotation of the display screen 102a about the swivel axis.

In accordance with an embodiment, the display apparatus 102 may be coupled to an external device (e.g. external device 104). The received user input may comprise one of a voice input, a gesture input, a touch input, or an input from the external device 104. The viewing mode may be one of a plurality of viewing modes. The plurality of viewing modes may comprise a cinema mode, an immersive mode, an immersive-three dimensional (3D) mode, a 3D mode, a wallpaper mode, a multi-user audience mode, a gaming mode, a mood-based mode, an ambience-based mode, an event-based mode, a content-adaptive mode, a karaoke mode, a child mode, a mirror mode, a pet mode, a shopping mode, and a default mode.

In accordance with an embodiment, the display screen 102a may be a transparent display screen. The circuitry 202 may be further configured to detect a user motion, and control the motion of the display screen 102a based on the detected user motion. The circuitry 202 may be further configured to determine a user position, and control the motion of the display screen 102a based on the determined user position.

In accordance with an embodiment, the display apparatus 102 may further comprise a memory (e.g. memory 208) configured to store user preferences. The circuitry 202 may be further configured to control the motion of the display screen 102a based on the stored user preferences. The circuitry 202 may be further configured to control the motion of the display screen 102a, based on date-time information for display of media content on the display screen 102a. The circuitry 202 may be further configured to control the motion of the display screen 102a, based on a playback of media content on the display screen 102a.

In accordance with an embodiment, the circuitry 202 may be further configured to control a horizontal displacement of the display screen 102a along a horizontal axis based on the received user input. The circuitry 202 may be further configured to control a direction of the horizontal displacement in accordance with a user position. In accordance with an embodiment, the circuitry 202 may be further configured to control a vertical displacement of the display screen 102a along a vertical axis. The vertical displacement may correspond to a change in an elevation of the display screen 102a from a ground plane.

In accordance with an embodiment, the circuitry 202 may be further configured to adjust a set of display attributes of media content on the display screen 102a based on the motion of the display screen 102a. In accordance with an embodiment, the circuitry 202 may be further configured to display media content on an unrolled display portion of the display screen 102a based on the motion of the display screen 102a. The circuitry 202 may be further configured to adjust an aspect ratio of the displayed media content in accordance with an area of the unrolled display portion. In accordance with an embodiment, the motion of the display screen 102a may cause a first display portion (e.g. first display portion 702) of the display screen 102a to fold over a second display portion (e.g. second display portion 704) of the display screen 102a about a fold axis.

In accordance with an embodiment, the circuitry 202 may be further configured to display first media content on the first display portion and second media content on the second display portion of the display screen 102a. In accordance with an embodiment, the display apparatus 102 may further comprise a holding mechanism (e.g. holding mechanism 102b) configured to be coupled to a room ceiling. The display screen 102a may be configured to be coupled to the holding mechanism 102b. In accordance with an embodiment, the holding mechanism 102b may comprise at least one actuator. The circuitry 202 may be further configured to control the at least one actuator to control the motion of the display screen 102a.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A display apparatus, comprising:
a display screen; and
circuitry configured to:
receive a user input that corresponds to selection of a viewing mode of the display screen, wherein the viewing mode is associated with a defined state and a defined swivel angle of the display screen;
detect a state of the display screen based on the received user input, wherein the detected state corresponds to one of a rolled state or an unrolled state of the display screen; and
control a motion of the display screen based on the received user input, wherein
the control of the motion corresponds to at least one of a change in the detected state of the display screen such that the state matches the defined state of the viewing mode or a change in a swivel angle of the display screen about a swivel axis such that the swivel angle matches the defined swivel angle of the viewing mode, and
the change in the swivel angle corresponds to a rotation of the display screen about the swivel axis.

2. The display apparatus according to claim 1, wherein the display apparatus is coupled to an external device, and
the received user input comprises one of a voice input, a gesture input, a touch input, or an input from the external device.

3. The display apparatus according to claim 1, wherein the viewing mode is one of a plurality of viewing modes, and
the plurality of viewing modes comprises a cinema mode, an immersive mode, an immersive-three dimensional (3D) mode, a 3D mode, a wallpaper mode, a multi-user audience mode, a gaming mode, a mood-based mode, an ambience-based mode, an event-based mode, a content-adaptive mode, a karaoke mode, a child mode, a mirror mode, a pet mode, a shopping mode, and a default mode.

4. The display apparatus according to claim 1, wherein the display screen is a transparent display screen.

5. The display apparatus according to claim 1, wherein the circuitry is further configured to:
detect a user motion; and
control the motion of the display screen based on the detected user motion.

6. The display apparatus according to claim 1, wherein the circuitry is further configured to:
determine a user position; and
control the motion of the display screen based on the determined user position.

7. The display apparatus according to claim 1, further comprising a memory configured to store user preferences, wherein the circuitry is further configured to control the motion of the display screen based on the stored user preferences.

8. The display apparatus according to claim 1, wherein the circuitry is further configured to control the motion of the display screen, based on date-time information for display of media content on the display screen and based on an installation environment of the display screen.

9. The display apparatus according to claim 1, wherein the circuitry is further configured to control the motion of the display screen, based on a playback of media content on the display screen.

10. The display apparatus according to claim 1, wherein the circuitry is further configured to control a horizontal displacement of the display screen along a horizontal axis based on the received user input.

11. The display apparatus according to claim 10, wherein the circuitry is further configured to control a direction of the horizontal displacement in accordance with a user position.

12. The display apparatus according to claim 1, wherein
the circuitry is further configured to control a vertical displacement of the display screen along a vertical axis, and
the vertical displacement corresponds to a change in an elevation of the display screen from a ground plane.

13. The display apparatus according to claim 1, wherein the circuitry is further configured to adjust a set of display attributes of media content on the display screen based on the motion of the display screen.

14. The display apparatus according to claim 1, wherein the circuitry is further configured to:
display media content on an unrolled display portion of the display screen, wherein an area of the unrolled display portion corresponds to the motion of the display screen; and
adjust an aspect ratio of the displayed media content in accordance with the area of the unrolled display portion.

15. The display apparatus according to claim 1, wherein the motion of the display screen causes a first display portion of the display screen to fold over a second display portion of the display screen about a fold axis.

16. The display apparatus according to claim 15, wherein the circuitry is further configured to display first media content on the first display portion and second media content on the second display portion of the display screen.

17. The display apparatus according to claim 1, further comprising a holding mechanism configured to be coupled to a room ceiling, wherein the display screen is configured to be coupled to the holding mechanism.

18. The display apparatus according to claim 17, wherein
the holding mechanism comprises at least one actuator, and
the circuitry is further configured to control the at least one actuator to control the motion of the display screen.

19. A method, comprising:
in a display apparatus that comprises a display screen:
receiving a user input that corresponds to selection of a viewing mode of the display screen, wherein the viewing mode is associated with a defined state and a defined swivel angle of the display screen;
detecting a state of the display screen based on the received user input, wherein the detected state corresponds to one of a rolled state or an unrolled state of the display screen; and
controlling a motion of the display screen based on the received user input, wherein
the control of the motion corresponds to at least one of a change in the detected state of the display screen such that the state matches the defined state of the viewing mode or a change in a swivel angle of the display screen about a swivel axis such that the swivel angle matches the defined swivel angle of the viewing mode, and the change in the swivel angle corresponds to a rotation of the display screen about the swivel axis.

20. The method of claim 19, further comprising controlling a horizontal displacement of the display screen along a horizontal axis based on the received user input.

* * * * *